Sept. 28, 1926.
E. P. BULLARD, JR., ET AL
1,601,235
CLUTCH
Filed May 2, 1925     2 Sheets-Sheet 1
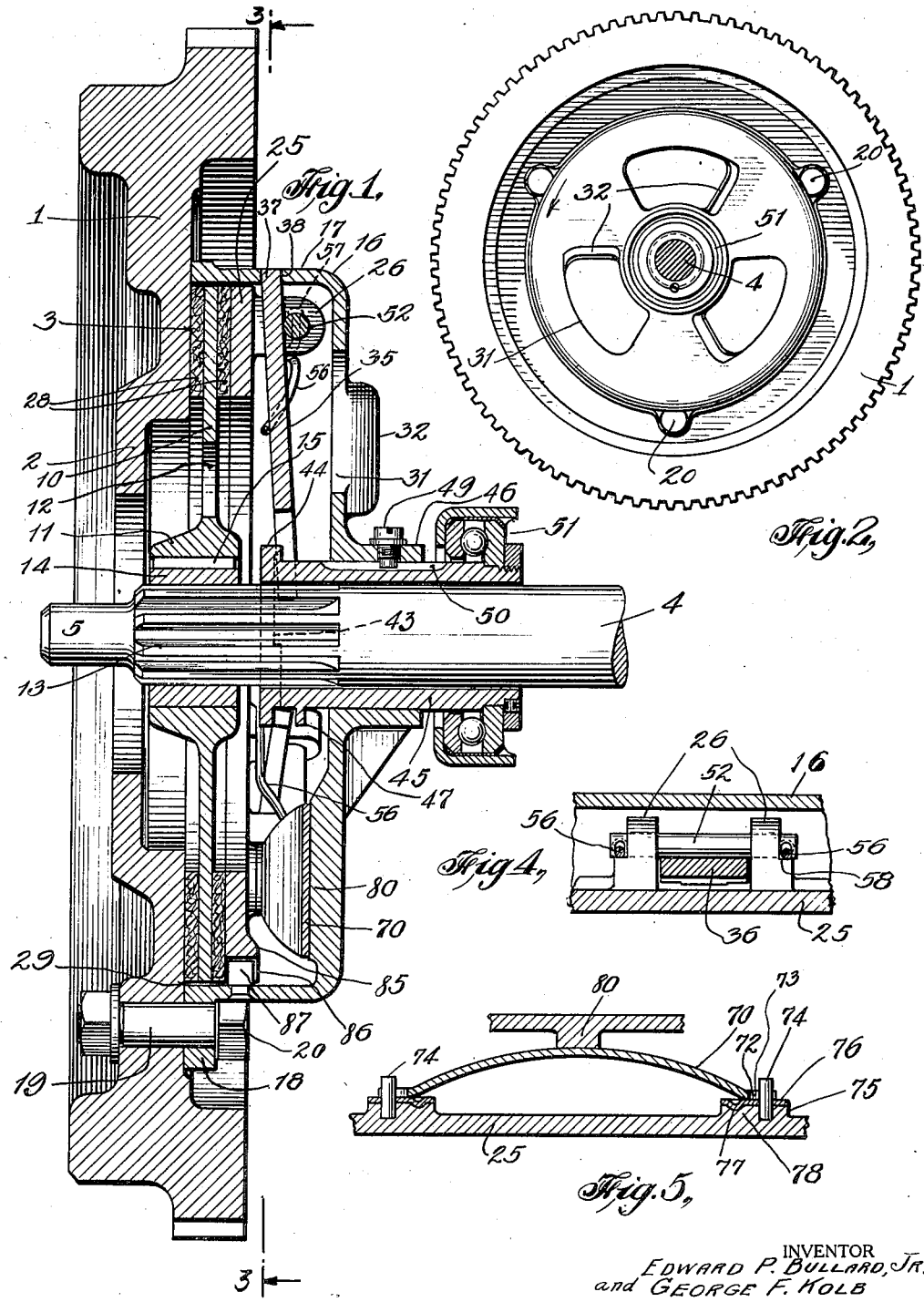
INVENTOR
EDWARD P. BULLARD, JR.
and GEORGE F. KOLB
BY
Dempster M. Smith
ATTORNEY Sept. 28, 1926.  1,601,235
E. P. BULLARD, JR., ET AL
CLUTCH
Filed May 2, 1925   2 Sheets-Sheet 2

INVENTORS
EDWARD P. BULLARD, JR.
and GEORGE F. KOLB
BY
Dempster M Smith
ATTORNEY Patented Sept. 28, 1926.

1,601,235

UNITED STATES PATENT OFFICE.

EDWARD P. BULLARD, JR., AND GEORGE F. KOLB, OF BRIDGEPORT, CONNECTICUT, ASSIGNORS TO THE BULLARD MACHINE TOOL CO., OF BRIDGEPORT, CONNECTICUT, A CORPORATION OF CONNECTICUT.

CLUTCH.

Application filed May 2, 1925. Serial No. 27,527.

Our invention relates to friction clutches especially adapted and valuable for use in motor vehicles and similar mechanisms. Since certain of its structural and operative features are of great importance in the automotive arts, the invention will be particularly described as physically embodied in a clutch structure which is especially adapted or available for such uses; but the invention is not limited in utility, and clutches embodying the invention may be used in many machines or for various purposes.

A principal object of the invention is to provide a clutch design, or combination and arrangement of parts, which may be manufactured at very low cost to meet the intense competitive conditions now existing in the motor vehicle industry, without sacrificing any essential structural or operative features of such clutches. Another important object is at the same time to provide improved structural and operative features such as simplicity, durability, gradual engagement, easy disengagement, great capacity for slippage without undue heating, high torque with moderate spring pressure, freedom from necessity for adjustment, and other features or advantages sufficiently mentioned hereafter.

Another important object is to provide for the practical employment in a clutch suitable for automotive and other uses, of springs of a special type, conveniently identified as "plate" springs, or otherwise, as "flat" springs, in distinction from the helical springs usually employed, although the spring plates are usually in practice not absolutely flat. The provision of suitable plate springs and their proper arrangement in connection with or in relation to other essential elements of the clutch, including the friction members and releasing means, provides many structural and operative advantages, including greatly reduced cost of production, greatly increased uniformity of individual springs and of the action of all the springs in the clutch, symmetrical arrangement and even balance of the clutch parts and the clutch as a unit, freedom from distortion of certain parts, such as the friction members or a pressure plate which usually constitutes one of the friction members, or, as otherwise stated, greatly improved distribution and equalization of pressure of the springs, which in turn greatly reduces localized wear and uneven action of the friction members or different parts of a friction member, and other improved structural and operative characteristics or advantages sufficiently referred to below.

A further object is to provide a clutch structure which is very compact both as to diameter and axial length, in proportion to torque capacity.

Another important object is to provide improved means for cooling and cleaning the clutch by air circulation, the air passages or circulating means being preferably arranged so that fragments or particles of the friction plates or composition friction rings produced by wear are discharged from the clutch and the injurious effects of the accumulation of such particles or fragments are avoided.

Another object is to provide a clutch structure or arrangement which will operate very efficiently without lubrication, although the friction surfaces may be lubricated if it is considered necessary or desirable.

The characteristics and advantages of the invention are further sufficiently explained in connection with the following detail description of the accompanying drawings, which show one physical embodiment of the invention. After considering this embodiment skilled persons will understand that many variations may be made within the principles of the invention, and we contemplate the employment of any structures that are properly within the scope of the appended claims.

Fig. 1 is a vertical, longitudinal section of a clutch embodying the invention in one form.

Fig. 2 is a right hand elevation.

Fig. 4 is a sectional detail of one of the releasing lever abutment pins and associated parts at 4—4, Fig. 3.

Fig. 5 is a sectional detail explaining the spring arrangement at 5—5, Fig. 3.

Figure 3:
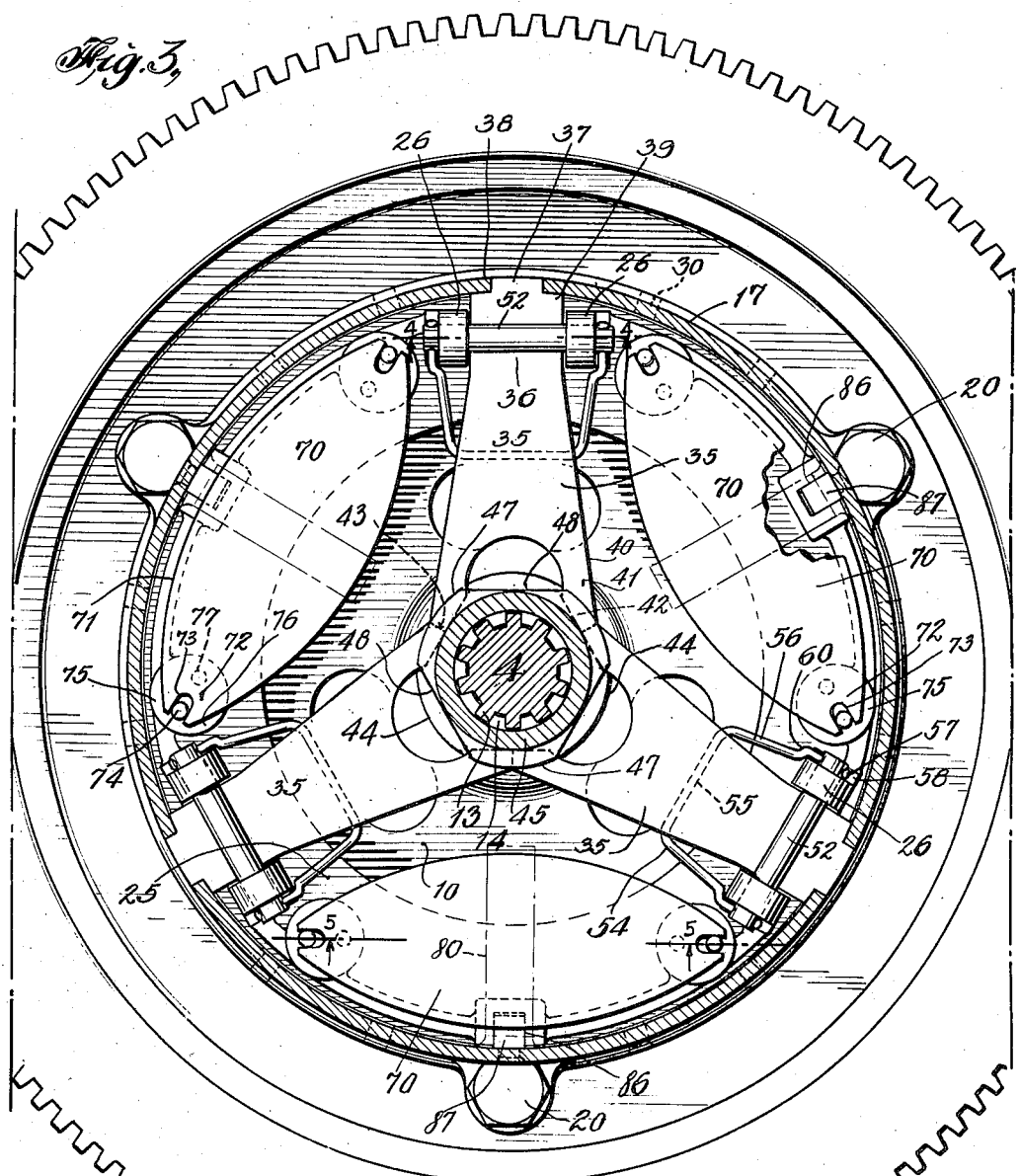
Fig. 3 is a vertical section at 3—3, Fig. 1.
Figure 6:
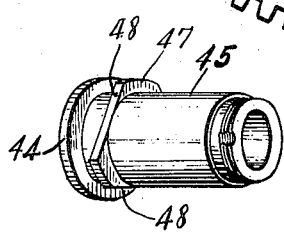
Fig. 6 is a perspective detail, reduced, of the shifter sleeve, or member which co-operates with the levers to release the clutch.

Figs. 1, 2 and 3 show one typical form of motor vehicle fly wheel 1, the inner web portion 2 of which is arranged for bolting to a flange on the engine crank shaft. The fly wheel has a flat annular rear face 3 which is used as one of the driving friction surfaces. Motor vehicle designers will understand without particular explanation how the clutch structure may be applied to or adapted for different types of fly wheels, with or without the provision of additional parts to be bolted to the fly wheel or arranged intermediate the clutch structure proper, and the fly wheel, in such cases, for example, as fly wheels which do not have a surface such as 3 available as one of the friction elements of the clutch. This and many other variations are within the scope of the claims, and no attempt will be made hereafter to explain the many possible structural variations, except in a few instances by way of example.

The clutch shaft 4 while shown in proper operative position in relation to the clutch and fly wheel, need not be considered a part of the clutch proper, but is more properly a part of the motor vehicle in which the clutch is to be mounted. This shaft usually carries at its rear end, (to the right in Fig. 1 and not shown) a pinion which is the primary or constant-mesh pinion of the transmission gearing. The front or left hand end 5 of the shaft as viewed in Fig. 1, of reduced diameter, is usually mounted by means of a ball or plain bearing in the rear end of the crank shaft or in a bearing seat provided in the fly wheel. Practically all other parts shown in the drawings constitute the clutch proper, and these parts are arranged substantially as an operative unit. Although they are not all firmly or physically connected together, as the clutch is arranged for shipment for installation in the vehicle, they may be easily held together by cords or wires so that the clutch is readily available for application as a unit, in easy and economical fashion, to the engine fly wheel and upon the clutch shaft 4.

The clutch proper includes a driven plate or spider 10 having a hub 11 and usually provided with apertures 12 to reduce weight and permit air circulation. The hub 11 may be arranged to fit directly upon the clutch shaft and will then have a spline formation to co-operate with the shaft spline arrangement, of which the splines 13 are one example; but preferably an adapter bushing 14 is provided to fit the bore of hub 11 in which it is irrevolubly secured by a key 15. The bore of each type of adapter is splined or otherwise formed to fit one of a number of different shaft-spline arrangements. The clutch may therefore be adapted to any of the various clutch shafts by inserting a suitable adapter bushing in the hub of the driven plate.

The driven member 10 is associated with and usually located in a member 16, conveniently identified as the clutch housing; although in the broader aspect of the invention this definition is not intended as a limitation since an important function of the member 16 is to properly locate or provide a fulcrum support for the releasing levers, and may in that case consist substantially only of a short cylindrical or ringlike member secured to the flywheel and provided with lever sockets. The member 16 may therefore be sometimes referred to, especially in the claims, as a lever support or fulcrum member. The member 16 in the form chosen for illustration, comprises a short cylindrical portion 17, the front or open end of which is provided with a plurality of, usually three, bolt lugs 18, which fit against the fly wheel face 3 and are secured to the fly wheel by bolts 19, suitably arranged bolt holes being usually provided in such fly wheels for the mounting of other types of clutch members; or bolt holes may be drilled as necessary in correspondence with the clutch diameter or arrangement of the attachment lugs 18. Portions of the bolt heads 20 are cut away to enable the bolt centers to be near the periphery of the cylindrical housing portion 17.

Within the housing 16 and confronting the rear face of the driven plate 10 is a pressure plate or flat ring 25, provided on its rear face with a plurality of pairs of lugs 26. Preferably, three pairs of these lugs are provided, equally spaced, in conformity with the general provision of certain parts, such as these lugs, the releasing levers, and the springs, in triplicate. This arrangement provides probably the greatest degree of what we may call functional symmetry, that is, uniform distribution or application of operative effects common to symmetrical three-point supporting or force applying devices or arrangments, well exemplified by the inherent stability and firm support of a three-legged stool on substantially any surface, without regard to considerable irregularities of the surface.

In some cases or for some purposes the clutch will operate satisfactorily with metal faces of the friction members, such as the fly wheel surface 3, plate 10 and pressure plate 25, in direct contact, and it will be understood that, with or without composition friction rings between the metal members, if the torque capacity of the clutch is insufficient with only a single driven member such as the plate 10, the number of driven members, plates or discs, may be increased to any reasonable extent, with a corresponding addition of driving members, plates or discs, in accordance with known principles of multiple disc clutch construction. The particular type of clutch illustrated is known in the automotive arts as a single plate clutch, reference being made to the single driven member 10, and such clutches are probably of the greatest simplicity for a plate or disc type of clutch, and provide sufficient torque capacity for many purposes including motor vehicles up to very substantial engine powers. When there is only a single driven member such as plate 10, it is usually preferred to insert composition friction rings 28 between plate 10 and the driving surface 3 of the fly wheel and pressure plate 25. These rings are usually of asbestos or asbestos composition with or without metal reinforcement. They may be secured to adjacent metal members by riveting or otherwise, but it is usually preferred to leave these rings entirely free from the adjacent metal bodies so that slipping may occur at either or both faces of either ring, which evidently distributes the wear uniformly on the metal surfaces.

For some purposes, and especially when means are provided as later referred to for circulating air through the clutch to cool and clean it, the diameters of the driven plate 10, pressure plate 25, and the friction rings 28, are substantially smaller than would be necessary to permit insertion and free longitudinal movement of these parts in the housing. This produces a moderate but substantial clearance as sufficiently indicated at 29, between the stated parts and the inside of the housing and the parts will, by centrifugal effect usually assume a slightly eccentric position, and the eccentric relation to the housing will vary from time to time, providing clearance for air circulation at sufficient different points around the inner periphery of the housing.

One or more apertures 30 are provided in housing portion 17 near the periphery of plate 10 or of the friction rings for the discharge of air, one preferred spacing of these holes being sufficiently indicated in Fig. 3. Air enters the housing through apertures 31 in its rear wall and preferably a forced circulation of air into, through, and out of the clutch through holes 30 is provided for by inclined fan or impeller blades 32 formed at the rear radial ends of apertures 31 (with reference to the direction of clutch rotation, as indicated in Fig. 2).

In some cases the shifter or clutch releasing element actuated by the vehicle driver may act directly on the pressure plate without power multiplication within the clutch; but to reduce the effort required for clutch release it is usually preferred to provide power multiplying levers in the clutch proper. In conformity with the stated arrangement of pressure plate lugs 26, three releasing levers 35 are provided. Each lever has an outward portion 36 fitting with slight clearance between the two lugs of one pair. The lever arrangement, with relation to the location of the fulcrum and resistance, may vary, but in a convenient and preferred arrangement the levers are of the second class with the resistance between the fulcrum and the power end. The outer or fulcrum end 37 of the lever is of reduced width and fits with slight clearance, for free fulcrum movement in the plane of the clutch axis, in a socket or aperture 38 provided in cylindrical housing portion 17. Shoulders 39 engage the inner periphery of the housing and prevent outward displacement of the levers. The form of the levers may vary considerably, but preferably for economy and ease of production they are formed of flat metal of substantial, uniform thickness. The lateral edges 40, inward from the portions 36, are at a divergent angle, and inner portions are cut away, producing fork or yoke ends 41, which have divergent inner faces 42 and end faces 43 which confront similar ends of adjacent lever portions, with or without slight clearance when the clutch is engaged, or when the levers are nearly radial, as in Fig. 1. The lever fork co-operates with a continuous flange 44 formed on the inner end of a shifter sleeve 45, which is mounted for reciprocation in a sleeve bearing 46 provided by a cylindrical extension on housing 16. This arrangement allows for slight disalignment of shaft 4 in relation to sleeve 45 or the clutch axis. Another flange 47 is formed on sleeve 45 in spaced relation to flange 44, and flange 47 is cut away at three places, 48, tangent to the sleeve surface, so that the remaining flange portions are segmental. The shifter sleeve 45 is inserted from the inner end of the clutch structure, (from the left in Fig. 1), and it is turned to such a position that the flange segments 47 will pass through the yoke spaces in the inner ends of the levers, the tangential or cut-away portions 48 passing the lever end faces 42. Flange 44 then rests against the forward faces of the lever forks; the shifter sleeve is rotated 1/6 of a revolution, bringing the flange segments 47 behind the lever fork members, and is secured against further rotation by a set screw 49 passing through housing sleeve 46 and engaging a longitudinal channel 50 in the shifter sleeve. The shifter is thus definitely located in relation to the lever ends with only slight clearance to permit the rocking movement of the levers and without any unnecessary lost motion or rattling.

A shifting fork or yoke is to be applied to the outer end of sleeve 45 in any known or suitable way, and a thrust bearing, such as 51, of any known or suitable type is usually located on the end of the shifter sleeve and arranged for engagement by the shifting yoke.

A pin 52, which may be identified as a lever-abutment pin, fulcrum pin, or pressure plate releasing member, is passed through the two lugs 26 of each pair, and is in contact with the rear face of the corresponding lever 35. The pin may be retained in the lugs in any suitable way, but preferably the retention of the pins is provided for in connection with yielding take-up devices which co-operate with the levers to maintain them at all times in contact with the releasing pins 52 and to prevent rattling of the levers against the pins or of the fulcrum ends 37 in their sockets. This means consists specifically of a piece of spring wire 54 bent in approximate bail or yoke form, having a mid portion 55 engaging the front face of the corresponding lever, side portions 56 of substantial length to enable the portions 55 to bear on the lever a substantial distance away from its fulcrum, and end portions 57 passing through holes in the ends of the pins outside the lugs 26. The outer ends of the take-up springs may be bent over or peened slightly to prevent pulling out of the pinholes. To insure the proper yielding bearing of the springs upon the levers, the lugs 26 are formed with substantially radial shoulders 58, and portions of the spring arms 56 bear against these shoulders at a substantial distance from the pins and so enable the springs to exert a leverage effect upon the levers and keep them in tight contact with the pins at all times. To prevent the spring arms moving outward through the holes in the pins, bends 60 may be made in the spring arms 56 to engage inward faces of the lugs.

In the broader aspect of the invention any known or suitable type or arrangement of springs may be used for clutch engagement, and the features above described have substantial novelty and utility apart from any particular spring type or arrangement; but an important feature of the invention as stated early above, is the provision of plate springs for clutch engagement, and the proper arrangement of these springs in relation to other essential clutch elements; and all the features of the present invention as represented by the embodiment described are arranged or adapted for co-operation with plate springs. The exact form or arrangement of the plate springs may vary considerably, the form or type shown being preferred, in a more limited aspect of the invention. In conformity with the general triplicate arrangement of certain parts above referred to, three plate springs 70 are provided. These are uniformly spaced or centered in a circular direction between the releasing levers and are arranged to act directly between the housing and the pressure plate. As viewed in elevation, the spring contour is preferably approximately oval. This form may vary considerably, but it is preferred to at least make the springs of a generally tapered form in each direction away from the centers, to provide for approximately uniform deflection. This requirement is very well met by the substantially oval form shown, which at the same time conforms readily to the circular contour of the housing; the outer edges 71, of arcuate contour, conforming exactly (with sufficient radial clearance) to the contour of the housing. The springs are usually punched out of flat sheet steel of suitable quality and the proper thickness, and are then bent, or "bowed", as referred to in some of the claims, while hot, to the proper curvature, substantially as indicated in Fig. 5, and quenched in a proper bath such as an oil bath, to establish the proper temper. Short end portions 72 are preferably left substantially straight, that is, they remain in the same plane after the spring is bent to form, and preferably these end portions are bifurcated by slots 73 to co-operate with retaining pins 74 set in spring seats 75 formed on the outer face of pressure ring 25. Desirably, washers 76 are placed on the faces of the spring seats 75 so that the actual spring bearing points are upon these washers. The pressure plate and certain other parts, as further mentioned below, are preferably made of cast iron, and in such cases the washers 76 are of hard steel to prevent wear of the seats by the sliding action of the spring ends as the springs are deflected, and also to provide for a smooth sliding contact of the spring ends during deflection. The washers may be circular to conform to the shape of the seats 75, and are provided with apertures fitting over the pins 74, and to prevent rotation, small bosses 77 may be pressed in the washers to co-operate with sockets 78 in the seats.

By the described arrangement or spring mounting, each spring bears at two widely separated points on the pressure plate (the advantage of which will be referred to below) and at its mid-point each spring bears against a radial seat 80 formed on the rear wall of the housing. When the springs are under initial strain sufficient to provide for proper friction pressure, the end portions 72 are substantially straight or in a common plane, or else may tilt slightly upward, and when the clutch is released and the springs are additionally deflected, these end portions tilt up still more in relation to their seats, and there is thus produced substantially a line contact between the spring ends and the seats, this line being the point of bending or curvature of the end portions 72 with relation to the main curved spring portion. On its outer face the pressure plate may have a reinforcing rib 85, which merges into the spring seats 75 at intervals.

Sockets 86 are formed at suitable intervals in the periphery of the pressure plate. These may be three in number and located substantially in line with the spring centers. They co-operate with studs 87 riveted or otherwise fixed in the cylindrical housing portion 17 to drive the pressure plate along with the other driving elements of the clutch.

The plate springs, produced substantially in the manner briefly described above, are not only very much cheaper than helical springs usually employed in motor vehicle clutches, but the plate springs may, with rapid and economical production methods, be produced with very small variations in pounds-pressure for a stated deflection, and when such moderate variations are deemed of consequence, the springs may be assorted by easy and economical inspection or test methods, in two or more groups, the springs of each group being similar in pressure values within a range of variation which is negligible for practical purposes, and these springs of given characteristics may have corresponding identifying marks. In the original assembly of the clutch or in replacement of springs, the springs may be chosen by their identifying marks so that all of them in one clutch will be substantially uniform. It is much more difficult to properly wind, fit and heat treat or temper helical springs to a similar degree of uniformity. Moreover, in operation, helical springs have a greater inherent variation, since they are liable to deflect laterally to variable degrees and therefore do not act so uniformly as our plate springs, even if their nominal characteristics are closely similar. The customary method of mounting helical springs is such that they bear at one point (or one area which is practically the spring diameter) on the housing or back-plate, and at a single other similar area on the pressure plate. If therefore, three helical springs are employed in a clutch of the present general type, the pressure is applied to the pressure plate only at three widely distributed points. It is practically impossible to make a pressure plate or ring within reasonable limits of cost, size and weight, which will not bend or warp substantially under pressure. Evidently therefore the pressure plate will bend sufficiently to cause the greatest friction contact to occur substantially at the points of spring pressure, and the greatest wear will occur at these points so that the action of the clutch will be more or less uncertain or non-uniform when new, and these difficulties will increase with use. Wear on the friction rings is also uneven and more destructive than when the pressure is properly distributed and bending or warping practically eliminated. In distinction from these conditions affecting clutches employing helical springs, each plate spring in a preferred arrangement, as shown and above described, bears at a single point on the housing or abutment plate, and also bears at two points on the pressure plate, so that with only three springs there are six pressure points against the pressure plate instead of three, and these pressure points or areas may moreover be evenly distributed since the effective length of each spring is, or may be made, substantially equal to the distance between the bearing points of adjacent springs, as clearly seen in Fig. 3.

The tendency to warp or otherwise distort the pressure and other plates is therefore very materially reduced, even if a pressure plate of ordinary thin section is provided. But to avoid bending or warpage and for other reasons the pressure plate is preferably made of very substantial thickness. Moreover, this and the driven plate 10 are preferably made of cast iron which is not only a cheap material and may be furnished in substantial thickness at low cost, but is very free from warpage either by aging of the metal or by the effect of frictional heat. There is therefore substantially no bending or warping of the pressure or other plates, and the pressure provided by the springs is substantially uniformly distributed throughout the friction areas which will therefore wear uniformly and slowly. An additional advantage of plate springs of the form shown, or similar forms, is that the bearing contacts with the pressure plate may be made quite near the periphery of the plate or ring where the torque is greatest. With helical springs of any practical size, their diameter is so great that the bearing points have to be moved inward substantially toward the center of the pressure plate where the torque effect is less or else the housings or other clutch dimensions have to be substantially increased and complicated or irregular formations of the housing and other parts must be provided.

In addition to resisting warpage, the cast iron plates, such as 10 and 25 and the heavy body of the engine fly wheel serve to easily take up frictional heat and transfer it to points where it is dissipated to air or to other metal bodies away from the friction surfaces. This cooling is promoted by the forced circulation of air into housing apertures 31 throughout practically the entire interior of the clutch, in contact with the metal bodies therein, and out through the discharge openings 30. This air in rapid circulation, picks up practically all particles of dust, consisting of metal particles and portions of the friction rings produced by wear, and carries these particles out of the clutch. This air circulation is very beneficial even if the clutch is enclosed in the usual bell housing, since the heat of the clutch is distributed to the relatively large body of air within the bell housing, even if ventilating openings are not provided therein. The continuous cleaning of the clutch from dust, etc., is of great importance, since when no means are provided for a continual or automatic cleaning, the dust tends to collect and built up on the friction surfaces and especially in any rivet recesses or like irregularities therein, and these dust accumulations will even build up to levels higher than the adjacent normal areas of the friction rings or metal plates, reducing the friction contact, cutting the metal surfaces, and causing other difficulties well understood in the art.

It will be noted that no provision is made for adjustment at any point, because the described construction and arrangement are such that no adjustment is necessary for a very high mileage, probably equal to the life of many of the vehicles in which the clutch will be used. The friction rings are of very substantial thickness and the clearance between the inner end of the shifter sleeve and the hub of the driven plate is sufficient to permit the inner ends of the levers to move forward and automatically compensate for any wear that occurs. This wear even after many thousands of miles of travel will, however, be very small, being measured in very small fractions of an inch at the friction surfaces, and the pressure plate and the inner ends of the levers will therefore move inward only slightly after a long period of service. In all operative positions of the clutch, and in all positions that the levers assume because of friction wear, the take-up springs will retain the outer portions of the levers in proper contact with the releasing pins and housing sockets, eliminating all noise and rattle and without any appreciable effect upon the main or clutch engaging springs. With moderate or reasonable total spring pressure, the torque value of the clutch is very high, since this available pressure is very uniformly distributed and utilized at the friction surfaces. Full release of the clutch is obtained with small movement of the shifter, although the power-multiplying ratio of the releasing levers is high. The slip-capacity of the clutch is also very high and practically unlimited, on account of the use of iron plates, very substantial thickness of the plates and their heat radiating capacity, the thickness of the friction rings, and the uniform pressure values, whether the clutch is fully engaged or slipping.

It will be noted that in a practical embodiment of the invention as here shown, there is an entire absence of small parts such as bolts, screws and nuts, which are found in considerable numbers in most clutches. The only bolts are those used to attach the housing to the fly wheel and there are no bolts or nuts in the clutch structure proper. The parts are all arranged to be practically self-retained in position without the use of such fastening devices.

We have therefore produced without sacrificing any operative advantages, but on the contrary with provision of distinctive and important structural and operative advantages, a clutch of great simplicity, high torque value, and ease of operation, which can be produced at a cost which is probably as low or lower than the cost of any satisfactory motor vehicle clutch now known or used.

We claim:

1. A friction clutch for automotive or other uses, comprising a driving member adapted to be connected with an engine fly wheel and having a rear portion arranged as a spring abutment, a pressure member axially movable in and connected to revolve with said driving member, a driven member adapted for irrevoluble connection to a clutch shaft and having frictional driving relation to the fly wheel and pressure member, annularly-spaced releasing levers acting between the driving member and the pressure member to retract the latter, a shifter acting upon the levers, and a plurality of plate springs interspaced with the levers between the pressure member and said abutment portion of the driving member, the springs being under initial compression and of substantially ovate form to provide approximately uniform deflection, and each having its ends bearing on the pressure member at widely separated points substantially in longitudinal alinement with the friction areas to provide a multiplicity of pressure-application points with minimized distortion of the pressure plate or other friction members, the central portions of the springs bearing against said abutment portion.

2. A friction clutch for automotive or other uses, comprising a driving member adapted to be connected with an engine fly wheel and having a rear portion arranged as a spring abutment, a pressure member axially movable in and connected to revolve with said driving member, a driven member adapted for irrevoluble connection to a clutch shaft and having frictional driving relation to the fly wheel and pressure member, annularly-spaced releasing levers acting between the driving member and the pressure member to retract the latter, a shifter acting upon the levers, and a plurality of plate springs interspaced with the levers between the pressure member and said abutment portion of the driving member, the springs being under initial compression and of substantially ovate form to provide approximately uniform deflection, and each having its ends bearing on the pressure member at widely separated points substantially in longitudinal alinement with the friction areas to provide a multiplicity of pressure-application points with minimized distortion of the pressure plate or other friction members, the central portions of the springs bearing against said abutment portion, and the outer contours of the springs conforming approximately to the curvature of the inner peripheral part of said driving member.

3. A friction clutch for automotive or other uses, comprising a housing adapted to be connected with an engine fly wheel and having a rear portion arranged as a spring abutment, a pressure member axially movable in and connected to revolve with said driving member, a driven member adapted for irrevoluble connection to a clutch shaft and having frictional driving relation to the fly wheel and pressure member, annularly spaced releasing levers acting between the driving member and the pressure member to retract the latter, a shifter acting upon the levers, and a plurality of plate springs interspaced with the levers between the pressure member and said abutment portion of the driving member, the springs being bowed and under initial compression, and each having its ends bearing on the pressure member at widely separated points substantially in longitudinal alinement with the friction areas to provide a multiplicity of pressure-application points with minimized distortion of the pressure plate or other friction members, the central portions of the springs bearing against said abutment portion.

4. A friction clutch for automotive or other uses, comprising separable driving and driven friction members, a pressure plate, a plurality of releasing levers arranged to act on the pressure plate to relieve friction pressure, a shifter for simultaneously operating the levers, a spring abutment, and a plurality of plate springs, each having a central portion bearing on the abutment and end portions bearing at widely separated points on the pressure plate, the bearing points upon the pressure plate being in substantially centralized alinement with the friction surfaces and uniformly distributed for equalized pressure effect.

5. A friction clutch for automotive or other uses, comprising separable driving and driven friction members, a pressure plate, a plurality of releasing levers arranged to act on the pressure plate to relieve friction pressure, a shifter for simultaneously operating the levers, a spring abutment, and a plurality of plate springs, each having end portions bearing on the pressure plate and an intermediate portion bearing on the abutment, the springs and their bearing points being in centralized alinement with the friction surfaces and substantially uniformly spaced in the circular direction to provide substantially uniform and equalized application of pressure with minimized distortion of friction members.

6. A friction clutch for automotive and other uses, comprising a driver, a housing fixed thereon, at least one driven plate in the housing arranged to co-operate with the driver and adapted for irrevoluble connection to a driven shaft, a pressure plate in the housing arranged for rotation therewith and axial movement therein, a plurality of pairs of lugs on the pressure plate, a releasing pin passing through the lugs of each pair, a releasing lever for each pair of lugs arranged between the pressure plate and the releasing pin and fulcrumed in the housing, and yielding means co-operating with the releasing pins and levers to retain the pins in position and hold the levers against the pins and prevent rattling.

7. A friction clutch for automotive and other uses, comprising a driver, a housing fixed thereon, at least one driven plate in the housing arranged to co-operate with the driver and adapted for irrevoluble connection to a driven shaft, a pressure plate in the housing arranged for rotation therewith and axial movement therein, a plurality of pairs of lugs on the pressure plate, a releasing pin passing through the lugs of each pair, a releasing lever for each pair of lugs arranged between the pressure plate and the releasing pin and fulcrumed in the housing, and a spring cooperating with the releasing pin and lever to retain the pin in position and hold the lever against the pin and prevent rattling.

8. A friction clutch for automotive and other uses, comprising a driver, a housing fixed thereon, at least one driven plate in the housing arranged to co-operate with the driver and adapted for irrevoluble connection to a driven shaft, a pressure plate in the housing arranged for rotation therewith and axial movement therein, a plurality of pairs of lugs on the pressure plate, a releasing pin passing through the lugs of each pair, a releasing lever for each pair of lugs arranged between the pressure plate and the releasing pin and fulcrumed in the housing, and a spring co-operating with the releasing pin and lever to retain the pin in position and hold the lever against the pin and prevent rattling, the lugs having portions engaged by said spring to cause the spring to exert a definite clearance take-up pressure on the lever.

9. A friction clutch suitable for automotive and other uses, comprising a housing adapted for attachment to a fly wheel, a driven plate in the housing adapted for connection to a clutch shaft, an annular pressure plate of substantial cross section irrevolubly connected in the housing and arranged for movement toward and from the driven plate, releasing levers fulcrumed in sockets in the housing and engaged with members of the pressure plate for clutch release, a shifter co-operating with inner portions of the levers, a plurality of plate springs uniformly interspaced with the levers and compressed between a rear part of the housing and the pressure plate, air intake apertures in a rear part of the housing, fan blades adjacent the apertures arranged to force air into the housing when the clutch rotates, and discharge apertures in a peripheral part of the housing substantially remote from the intake aperture for the discharge of air carrying dust and other extraneous matter.

10. A friction clutch suitable for automotive and other uses, comprising a housing adapted for attachment to a fly wheel, a driven plate in the housing adapted for connection to a clutch shaft, an annular pressure plate of substantial cross section irrevolubly connected in the housing and arranged for movement toward and from the driven plate, releasing levers fulcrumed in sockets in the housing and engaged with members of the pressure plate for clutch release, a shifter co-operating with inner portions of the levers, a plurality of plate springs uniformly interspaced with the levers and compressed between a rear part of the housing and the pressure plate, air intake apertures in a rear part of the housing, fan blades adjacent the apertures arranged to force air into the housing when the clutch rotates, and discharge apertures in a peripheral part of the housing substantially remote from the intake apertures for the discharge of air carrying dust and other extraneous matter, the driven plate and pressure plate being of substantially smaller diameter than the peripheral interior of the housing, to permit air circulation and dust discharge.

11. A clutch comprising driving and driven members, releasing members having fork formations at their inner ends, a shifter sleeve having an annular lever-fork channel defined by a continuous flange and an interrupted flange, the lever fork members being engaged in the channel by a longitudinal movement of the shifter while in one rotative position followed by a part rotation of the shifter, and means for securing the shifter against rotation in relation to the levers to retain the lever fork members in operative positions in the channel.

12. A clutch comprising driving and driven members, releasing members having forked inner ends, a shifter sleeve having an annular lever-fork engaging channel formed by two spaced flanges, one of the flanges being substantially continuous and the other being at intervals cut away tangent to the sleeve, the lever fork members being engaged in the channel by a longitudinal movement of the shifter in one rotative position followed by a part rotation of the shifter, and means for securing the shifter against rotation in relation to the levers to retain the fork members in operative positions in the channel.

Signed at Bridgeport in the county of Fairfield and State of Connecticut this 22nd day of April A. D. 1925.

EDWARD P. BULLARD, Jr.
GEORGE F. KOLB.